May 23, 1967 W. M. OVERN 3,321,749

MAGNETIC MEMORY APPARATUS

Filed Oct. 29, 1962

5 Sheets-Sheet 1

INVENTOR
WILLIAM M. OVERN
BY Herbert F. Sonnemeyer
ATTORNEY

May 23, 1967 W. M. OVERN 3,321,749

MAGNETIC MEMORY APPARATUS

Filed Oct. 29, 1962 5 Sheets-Sheet 2

PRIOR ART Fig 3a

May 23, 1967 W. M. OVERN 3,321,749

MAGNETIC MEMORY APPARATUS

Filed Oct. 29, 1962 5 Sheets-Sheet 5

3,321,749
MAGNETIC MEMORY APPARATUS

William M. Overn, Egan Township, Dakota County, Minn., assignor to Sperry Rand Corporation, New York, N.Y., a corporation of Delaware Filed Oct. 29, 1962, Ser. No. 233,666
12 Claims. (Cl. 340—174)

This invention relates in general to a magnetic memory apparatus and in particular to a method of operating a magnetic memory apparatus, which method utilizes a pre-write disturb pulse and which permits an overlapping of the pre-write disturb pulse and the leading edge of the write pulse to achieve time-limited or amplitude-limited switching of the magnetic memory element.

The value of the utilization of small cores of magnetic material as memory elements in electronic processing systems is well known. This value is based upon their bi-stable characteristics which include the ability to retain, or remember, magnetic conditions which may be utilized to indicate a binary 1 or 0. As the use of cores in memory systems increases, a primary means of improving the computational speed of the associated computer is to devise means of decreasing the time required to switch the core from one magnetic state to the other, and to decrease the memory sytem cycle time, i.e., minimum time allowable between consecutive memory system read-out or write-in. Also, as the cost of the memory system makes up a substantial portion of the total cost of the associated electronic data processing system, new methods and techniques of achieving reliable and economical interconnections of the cores of the memory system are continually being sought. This invention provides a novel technique whereby a symmetrical, bi-polar, read-write signal may be coupled to the cores through the use of conventional pulse transformers and whereby the memory system's read-write cycle time may be decreased through the use of the combination of the concepts of time-limited switching and a pre-write disturb pulse.

Ordinary cores and their control circuits utilized in memory systems are now so well known that they need no special description herein. However, for purposes of the present invention, it should be understood that such cores are capable of being magnetized to saturation in either of two directions. The term "saturation" as used in the specification shall describe that condition of the core wherein increase of the drive field amplitude or duration will cause no appreciable increase in the core flux density. Furthermore, these cores are formed of magnetic material which is selected to have at least two stable remanent magnetic states which assures that after the core has been saturated in either direction and the drive field has been removed, a definite point of magnetic remanence representing the residual flux density in the core will be retained. The residual flux density representing the point of magnetic remanence in a core possessing such characteristics is preferably of substantially the same magnitude as that of its maximum saturation flux density. These cores are usually coupled by circuits providing one or more input windings for purposes of switching the core from one magnetic state corresponding to a particular direction of saturation, i.e., positive saturation denoting a binary 0 to the other magnetic state corresponding to the opposite direction of saturation, i.e., negative saturation denoting a binary 1. One or more output windings are usually provided to sense when the core switches from one state of saturation to the other. Switching of a core can be achieved by passing a drive signal of sufficient amplitude through the input windings in a manner so as to set up a magnetic field in the area of the core in the sense opposite to the existing flux direction, thereby driving the core to saturation in the opposite direction of polarity, i.e., from negative to positive saturation. When the core switches, the resulting magnetic field variation induces a signal in the other windings on the core such as, for example, the above mentioned output, or sense winding. The amplitude, or polarity, of the output signal identifies the stored state as having been a 1 or a 0.

One method of achieving a decreased magnetic core switching time is to employ time-limited switching techniques as compared to amplitude-limited switching techniques. In employing the amplitude-limited switching technique, the hysteresis loop followed by a core in cycling between its 1 and 0 states is determined by the amplitude of the drive signal, i.e., the amplitude of the magnetomotive force applied to the core. This is due to the fact that the duration of the drive signal is made sufficiently long to cause the flux density of each core in the memory system to build up to the maximum possible value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In employing the amplitude-limited switching technique, it is a practical necessity that the duration of the read-drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a memory system that all the cores therein reach the same state or degree of magnetization on read-out of the stored data. Also, where the final core flux density level is limited solely by the amplitude of the applied drive field, it is necessary that the cores making up the memory system be carefully graded such that the output signal from each core is substantially the same when the state of each core is reversed, or switched.

In a core operated by the time-limited technique the level of flux density reached by the application of a drive field of a predetermined amplitude is limited by the duration of the drive field. A typical cycle of operation according to this time-limited operation consists of applying a first drive field of a predetermined amplitude and duration to a selected core for a duration sufficient to place the core in one of its normal steady-state but unsaturated conditions, i.e., amplitude-limited. A second drive field having a predetermined amplitude and a polarity opposite to that of the first drive field is applied to the core for a duration insufficient to allow the core flux density to reach a steady-state condition, i.e. time-limited. The term "steady-state" when used in this specification, shall mean that condition of the core wherein with a constant drive field amplitude, increase of the drive field duration shall cause no appreciable increase in core flux density. This second drive field places the core in a second, time-limited, stable-state, the flux density of which is considerably less than the flux density of the second stable state that is normally used for conventional, or amplitude-limited, operation. The second stable-state may be fixed in position by the asymmetry of the two drive field durations and by the procedure of preceding each second drive field duration with a first drive field application. Additionally, the second time-limited stable-state may be fixed in position by utilizing a saturating first drive field to set the first stable-state as a saturated state.

In conventional bit-organized and word-organized memory systems wherein cores possessing substantially rectangular hysteresis characteristics are utilized for the storing media, for reasons stated hereinbefore, a read signal larger than the write signal is utilized to ensure the switching of any selected core of the memory system into the 0 state. As mentioned in the previous discussion, this is accomplished by utilizing an asymmetrical read-write signal to achieve the larger read field which is required for efficient core operation.

Due to the simpler and less expensive arrangements of transformer coupling as compared to transistor-diode coupling of drive signals to magnetic memory systems, transformer-coupling techniques are very desirable. However, in a transformer-coupled system, it is essential that a symmetrical bipolar read-write signal be used as the current integral of the bipolar read-write signal must be zero to ensure that no current bias shift can accumulate on the selected transformer-coupled line due to repeated selections. Applicant's novel method provides an asymmetrical bipolar read-write field while utilizing a symmetrical bipolar read-write signal. By timing a disturb pulse to overlap the leading edge of the write pulse, a write field, having a smaller amplitude-duration characteristic than the read field, is generated. Further, by varying the overlap of the write pulse and the pre-write disturb pulse, it is possible to achieve either time-limited or amplitude-limited operation.

One prior art technique employed to decrease memory cycle time and to stabilize the core after the completion of the write pulse is to utilize a post-write disturb pulse. In a bit-organized memory system utilizing coincident current read-write techniques, half-select pulses cause the coupled cores to traverse minor hysteresis loops producing small but unwanted noise signals. If a half-selected core is in an undisturbed 1 state the application of a positive half-select current pulse during a reading operation causes the core to move through a minor hysteresis loop to a first disturbed 1 state. Subsequently, the application of a negative half-select current pulse during a writing operation causes the core to move toward negative saturation and into a second disturbed 1 state. However, shortly after the termination of the negative half-select current pulse, a positive current pulse, referred to as the post-write disturb pulse, is applied to the inhibit winding causing the half-selected core to return to a third disturbed 1 state which lies between the first disturbed 1 state and the second disturbed 1 state, but nearer the first disturbed 1 state. During the next read operation, if the same core is subjected to a positive half-select current pulse, the magnetic state of the core traverses an even smaller minor hysteresis loop and returns to practically the same position from which it started. Likewise, if a half-selected core is in the undisturbed 0 state, the application of a positive half-select current pulse during a reading operation causes the magnetic state of the core to move toward positive saturation and back to essentially an undisturbed 0 state. Subsequently, the application of a negative half-select current pulse during the write operation causes the magnetic state of the core to move toward negative saturation and into a first disturbed 0 state. However, shortly after the termination of the negative half-select current pulse, a post-write disturb pulse is applied to the inhibit winding causing the magnetic state of the half-selected core to return to a second disturbed 0 state which lies between the undisturbed 0 state and the first disturbed 0 state, but nearer the first disturbed 0 state. During the next read operation, if the same core is subjected to a positive half-current pulse, the magnetic state of the core traverses and even smaller minor hysteresis loop and returns to practically the same disturbed position from which it started. If it were not for the hysteresis loop previously traversed by the magnetic state of the core due to the post-write disturb pulse, the hysteresis loop now traversed in this next read operation would create a flux change that would induce a partial-select noise pulse in the sense winding that would be of a greater magnitude than that realized without the use of the post-write disturb pulse. Thus, a post-write disturb pulse effectively reduces the magnitude of subsequent noise pulses.

The applicant has discovered that by positioning the disturb pulse before the write pulse rather than after the write pulse the subsequent noise pulses due to half-select current pulses coupled to half-selected cores are effectively reduced in magnitude. Further, by utilizing a pre-write disturb pulse rather than a post-write disturb pulse the required delay between the termination of the write pulse and the initiation of the subsequent read-write cycle is substantially reduced thus decreasing the required memory system cycle time. Further, with the use of a pre-write disturb pulse the memory system decision time—i.e., the time from initiation of the strobe-read pulse until limitation of the inhibit pulse, which time is utilized to determine if a 0 or a 1 is to be written into the selected magnetic memory element—may overlap the leading edge of the write pulse further reducing the memory system cycle time by reducing the delay between the termination of the read pulse and the initiation of the write 1 pulse. Additionally, by varying the overlap of the write pulse and the disturb pulse it is possible to achieve either time-limited or amplitude-limited operation.

Accordingly, it is a primary object of the present invention to provide a novel method of operating a magnetic memory element wherein one magnetic stable-state is achieved through the employment of amplitude-limited switching and the other magnetic state is achieved through the employment of time-limited switching while transformer-coupling a symmetrical read-write signal to the magnetic memory element drive windings.

Another object of this invention is to provide a novel method of operating a magnetic memory element wherein a prewrite disturb pulse is positioned between the read and write pulses of the drive field so as to effectuate a reduction in the magnitude of subsequent half-select current pulse induced noises on the sense winding.

Another object of this invention is to provide a novel method of operating a magnetic memory element wherein the memory system decision time is permitted to overlap the write pulse.

Another object of this invention is to provide a novel method of operating a magnetic memory element utilizing time-limited switching and a pre-write disturb pulse to reduce memory system cycle time.

Another object of this invention is to provide a novel method of operating a magnetic memory element by utilizing a prewrite disturb pulse between the read pulse and the write pulse so as to effectuate a reduction in the magnitude of subsequent noise pulses due to half-select current pulses coupled to half-selected cores of a coincident current, or bit-organized, memory system.

Another object of this invention is to provide a novel method of operating a magnetic memory element wherein the magnetic memory element is caused to operate between two magnetic states by the application of drive fields of asymetrical time durations but of equal amplitudes.

A further and more general object of this invention is to provide a novel method of operating a magnetic memory element.

These and other more detailed and specific objects will be disclosed in the course of the following specification, reference being had to the accompanying drawings, in which.

FIG. 3*a* is an illustration of the relationship of the control signals and drive fields utilized in a bit-organized memory system utilizing a post-write disturb pulse and amplitude-limited switching.

Figure 3B:
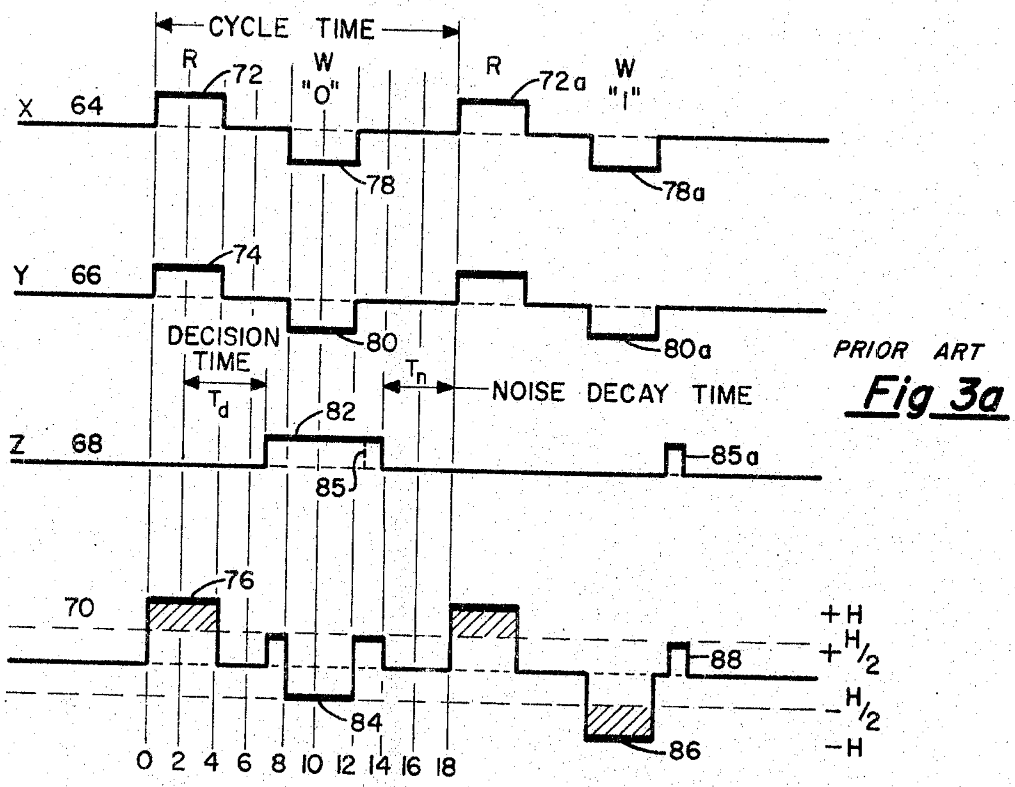

FIG. 3*b* is an illustration of the relationship of the control signals and drive fields utilized in a bit-organized memory system utilizing applicant's pre-write disturb pulse and time-limited switching.

Figure 3B:
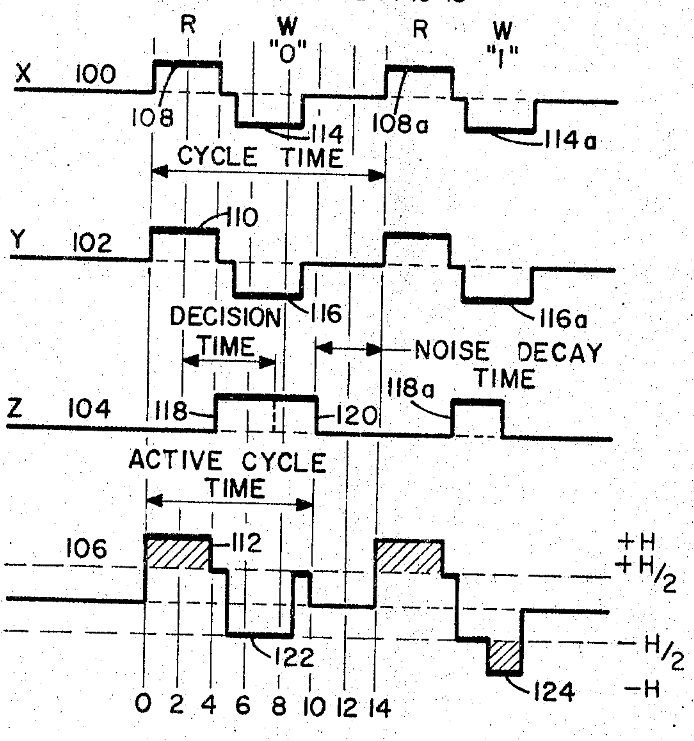
Figure 3C:
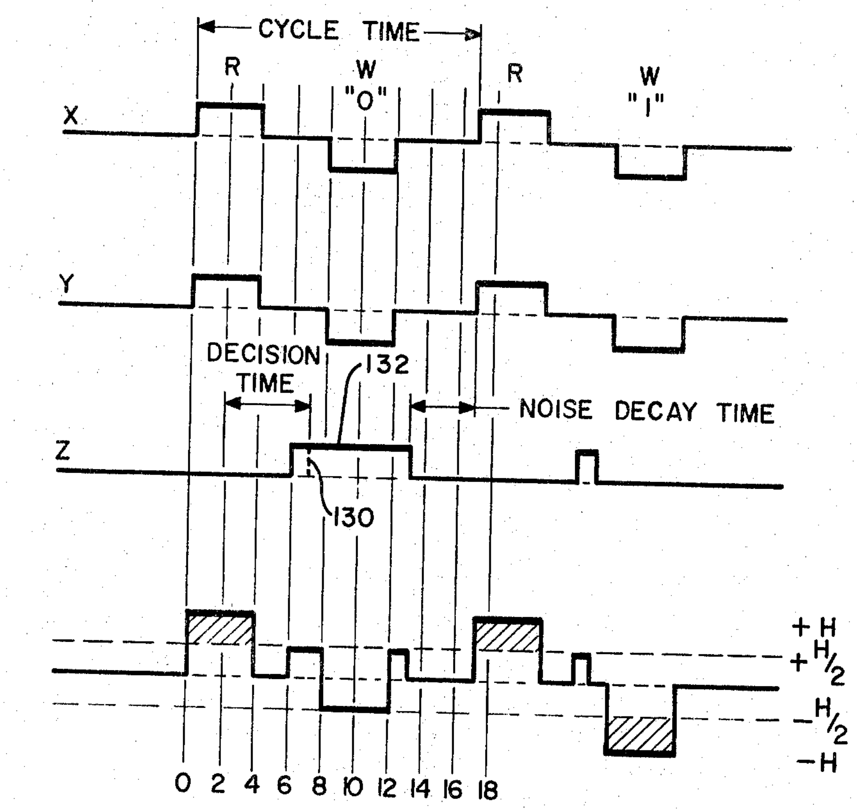

FIG. 3*c* is an illustration of the relationship of the control signals and drive fields utilized in a bit-organized memory system utilizing applicant's pre-write disturb pulse and amplitude-limited switching.

Figure 2:
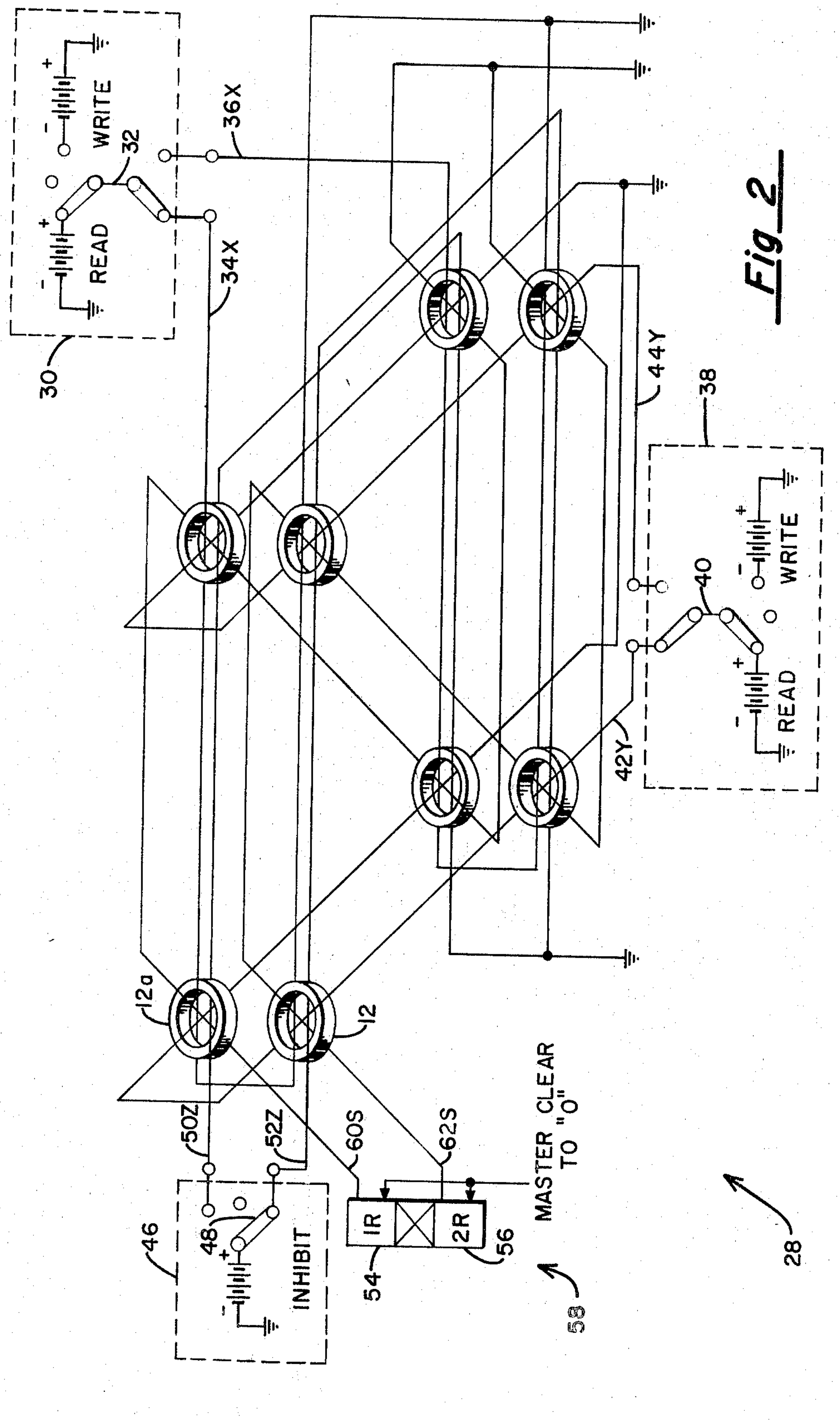
FIG. 2 is an illustration of a preferred embodiment of a magnetic memory system to utilize applicant's method of operating a magnetic memory element.
Figure 4:
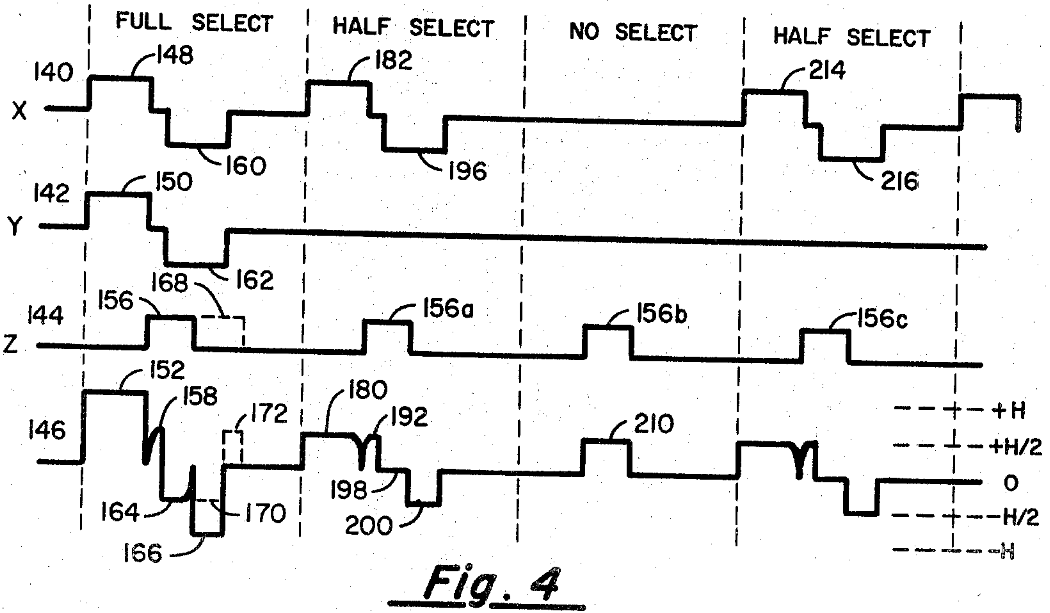

FIG. 4 is an illustration of the control signals and drive fields utilized in the embodiment of FIG. 2.

Figure 5:
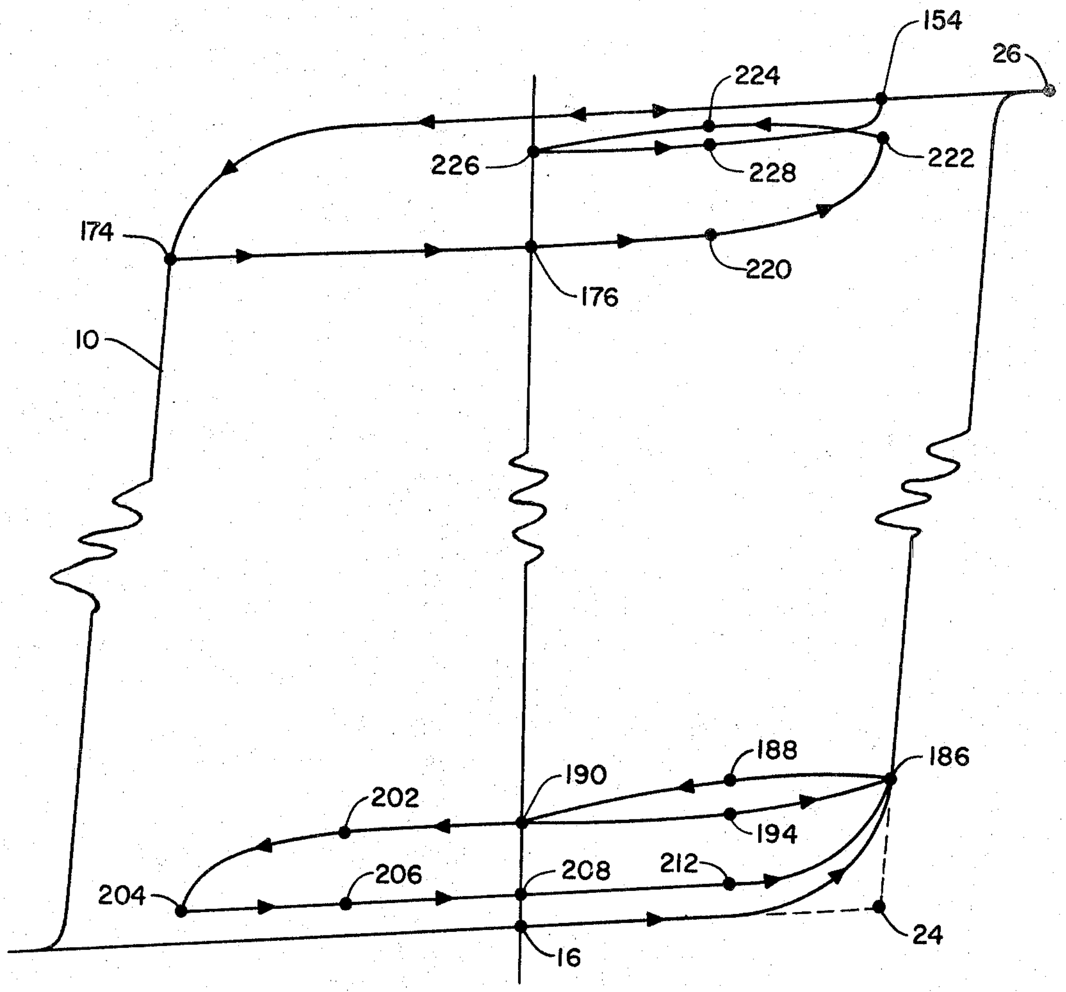

FIG. 5 is an illustration of the magnetic state variations of a core of FIG. 2 when subjected to the drive fields of FIG. 4.

Figure 1:
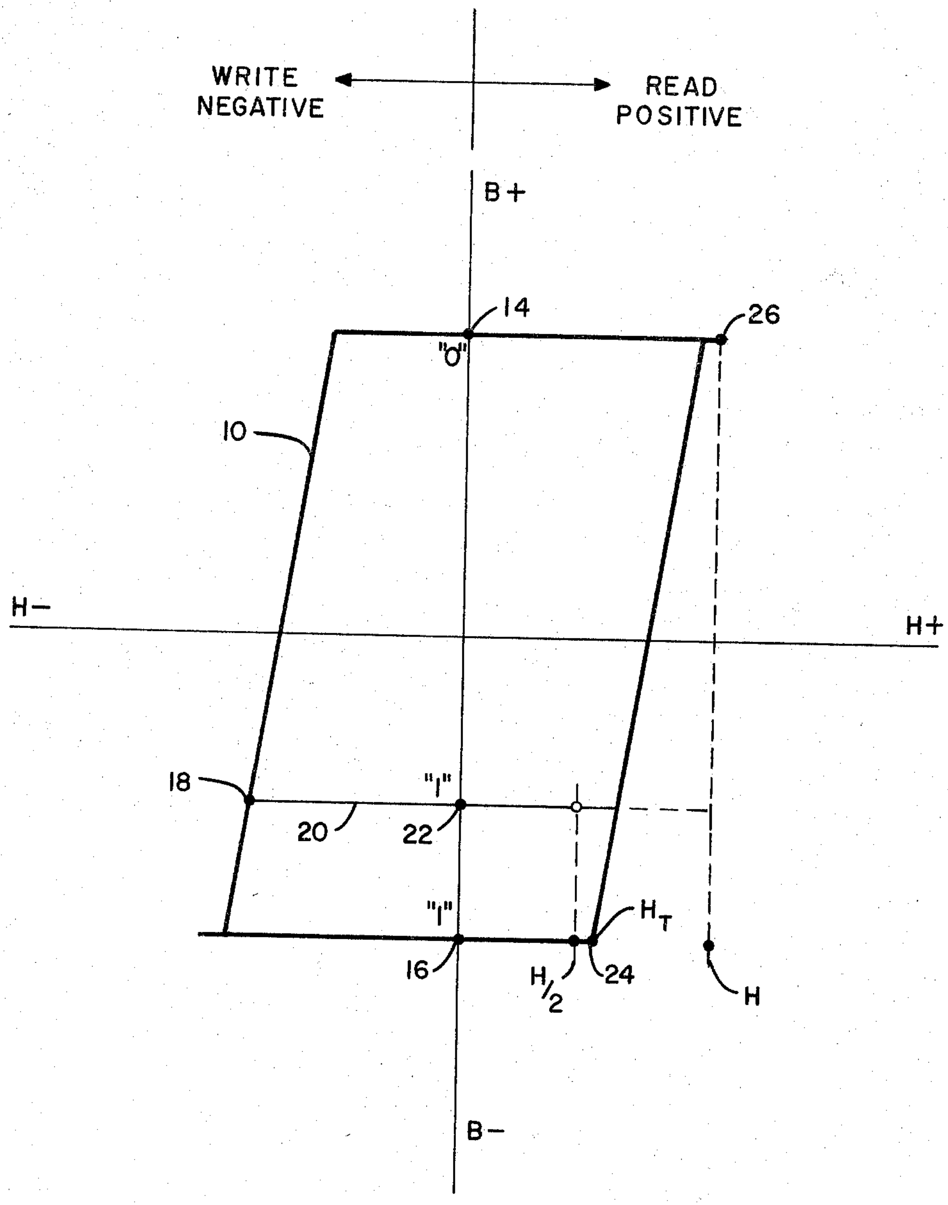
FIG. 1 is an illustration of the rectangular hysteresis loop characteristic of the magnetic memory elements utilized in the preferred embodiment of FIG. 2.

This invention is concerned with a highly efficient method of operation of the magnetic memory elements, or cores, of a magnetic memory system. Such cores are binary storage devices in that they possess at least two stable remanent magnetic states having a rectangular hysteresis loop type characteristic as shown in FIG. 1 and are set in any one of their stable remanent magnetic states by energizing windings that are magnetically coupled to the core and that apply a magnetomotive force thereto of a desired amplitude-duration characteristic and direction. Hysteresis loop 10 of FIG. 1 is a hysteresis loop normally chosen for optimum operation of a core 12 and describes the path followed by the magnetic state of said core when subjected to a magnetizing drive field less than a saturating field but of a sufficient amplitude-duration characteristic to set said core in an amplitude-limited remanent state. Thus, when core 12, whose magnetic state is initially in an unsaturated, amplitude-limited remanent state such as point 14 indicative of a stored 0, is subjected to a write 1 drive field which is equal to, but of opposite polarity than, the read drive field which placed the magnetic state of core 12 initially at point 14, the magnetic state of core 12 follows loop 10 coming to rest at point 16 indicative of a stored 1. When core 12 is then subjected to the read drive field of above, the magnetic state of core 12 follows loop 10 again coming to rest at point 14. This magnetic state operation of core 12 may be described as amplitude-limited operation. Now, if core 12 is subjected to a write 1 drive field which is of the same amplitude as, but of a duration substantially less than, the read drive field of above, the magnetic state of core 12 follows loop 10, but being limited by the duration of the write 1 drive field, follows loop 10 to point 18 whereupon the magnetic state of core 12 follows a minor hysteresis loop portion 20 coming to rest at point 22 indicative of a stored 1. This magnetic state operation of core 12 may be described as time-limited operation. Copending patent applications Ser. No. 853,067, filed Nov. 16, 1959, now abandoned, and Ser. No. 139,947, filed Sept. 22, 1961, now Patent No. 3,274,570, both assigned to the assignee of this invention, discuss in detail such time-limited and amplitude-limited operating conditions.

As stated above and considering amplitude-limited operation, the application of a drive field to core 12 causes the magnetic state of core 12 to follow a hysteresis loop as a function of the direction and amplitude of the field. The amplitude of the field necessary to effect a substantial flux change in core 12 is defined as the threshold force $H_T$ and is illustrated as point 24 of FIG. 1. Further, the amplitude of the field necessary to effect a reversal of the magnetic state of the core, such as from point 16 which represents the negative remanent magnetic state and a stored 1 condition, to point 14, which represents the positive remanent magnetic state and a stored 0 condition, is defined as the reversing field H and is illustrated as point 26 of FIG. 1. It will thus be appreciated that a core 12 affected by a field less than $H_T$ and in a stored 1 condition, will generate a negligible output signal in a sense winding coupled thereto, while a core affected by a field H will generate a substantial output signal in a sense winding coupled thereto. Consequently, in most prior art magnetic memory systems the field affecting any half-selected core is generally less than $H_T$ so as to provide a high signal-to-noise ratio. The field H necessary to reverse the state of the core can be generated by a current conducted by one or more windings coupled thereto, the current in each winding generating a field less than $H_T$ while the coincidence of the currents in all the windings should be at least as large as H. In the embodiment of FIG. 2 each core 12 is coupled by two windings, termed the X and Y lines, which individually intercouple all the cores of each row and column, respectively. Application of a half-select current pulse to each X and Y line generates a field $H/2$ which is ineffective to cause a substantial magnetic flux change in the cores 12 coupled only to a selected X or Y line, but generates a field H in the area of the core 12 at the intersection of the selected X and Y lines which coincidence causes a substantial magnetic flux change in said core 12.

FIG. 2 is an embodiment of a memory system that may be utilized to illustrate applicant's method of operation of a memory system. Memory system 28 is composed of a plurality of cores 12 arranged in two rows and two columns in two planes of four cores 12 per plane. Drive pulse source 30 is selectively coupled via switch means 32 to drive line 34X and drive line 36X which intercouple all the cores 12 of similarly positioned rows of the top and bottom planes. Similarly, drive pulse source 38 is selectively coupled via switch means 40 to drive line 42Y and drive line 44Y which intercouple all the cores 12 of similarly positioned columns of the top and bottom planes. Inhibit pulse means 46 is selectively coupled via switch means 48 to inhibit line 50Z and inhibit line 52Z which lines intercoupled all the cores of the top and bottom planes, respectively. Stages 54 and 56 of output register 58 are coupled to all the cores 12 of the top and bottom planes by way of sense, or output, lines 60S and 62S, respectively.

FIG. 3*a* illustrates the signal wave forms utilized in conventional memory system operation. Wave forms 64, 66 and 68 are the signals emanating from sources 30, 38 and 46, respectively, and coact to produce the effective field of wave form 70 on the selected core 12*a*. As explained herein, the read operation and write operation of memory system 28 are accomplished by a sequence of current pulses passing through appropriate intercoupled line-core combinations. Writing of information into core 12*a* is accomplished in three steps termed the Clear, Write and Disturb steps, while the reading of information out of the core 12*a* is accomplished in three coresponding steps termed the Read, Restore and Disturb steps.

Writing of information in core 12*a* is initiated by a Clear step which consists of the application of pulses 72 and 74 to lines 34X and 42Y, respectively, which pulses coact to generate field pulse 76 at core 12*a* which core is in the area of the intersection of lines 34X and 42Y. All other cores 12 that are coupled to lines 34X and 42Y are affected by half-select fields which are ineffective to switch the magnetic state of the half-selected cores 12. The Write step which consists of the application of pulses 78 and 80 to lines 34X and 42Y, respectively, closely follows the termination of the Clear field pulse 76. If a 0 is to be written into core 12*a* an inhibit pulse 82, which originates in source 48 and which overlaps pulses 78 and 80, is coupled to line 50Z by switch means 48. The coaction of pulses 78, 80 and 82 generate field pulse 84 at core 12*a* which core is in the area of the intersection of lines 34X, 42Y and 50Z. The Disturb step, which consists of the application of post-write disturb pulse 85 to line 50Z is initiated at the termination of pulse 82, and with the writing of 0 appears as an extension of pulse 82. After an appropriate period of time to permit the decay of core and signal disturbances—termed noise decay time—the following read-write cycle may be intiated. If a 1 is to be written into core 12a inhibit pulse 82 is not coupled to line 50Z. Not coupling pulse 82 to line 50Z permits pulses 78a and 80a to coact generating field pulse 86 which switches core 12a to the magnetic state opposite to a stored 0 state, or to a stored 1 state. Shortly after termination of field pulse 84, post-write disturb pulse 85a, which is generated in source 46, is coupled to line 50Z by switch means 48. Pulse 85a generates field pulse 88 which places the magnetic state of core 12a in the disturbed 1 state.

Reading of information from core 12a is initiated by a Read step which is similar to the Clear step of the write operation except that when core 12a containing a stored 1 is switched, the changed in flux in core 12a is detected on line 60S and the voltage induced therein is coupled to stage 54 setting it to a stored 1. Stages 54 and 56 of output register 58 may be conventional bistable flip-flops master-cleared to contain 0's prior to memory system operation. Lines 60S and 62S are coupled to the set inputs of stages 54 and 56, respectively, of output register 58, which lines 54 and 56 if subjected to a flux change indicative of a stored 1, set the respective stage to a 1. Cores in the stored 0 state are not switched by the field generated during the Read step, so as a result a negligible signal is produced on the respective line 60S or 62S resulting in the respective stage 54 or 56 of output register 58 remaining in the Cleared 0 condition. The Restore step of the read operation is similar to the Write step of the write operation and its function is to write-in the information that was destroyed during the Read step. The Disturb step of the read operation serves the same function as the Disturb step of the write operation.

FIG. 3b illustrates the signal wave forms utilized in the preferred embodiment of applicant's method of memory system operation. Wave forms 100, 102 and 104 are the signals emanating from sources 30, 38 and 46, respectively, and coact to produce the effective field of wave form 106 on the selected core 12a.

Writing of information in core 12a is initiated by a Clear step which consists of the application of current pulses 108 and 110 to lines 34X and 42Y, respectively, which pulses coact to generate field pulse 112 at core 12a, which core is in the area of the intersections of lines 34X and 42Y. All other cores 12 that are coupled to lines 34X and 42Y are affected by half-select fields which are ineffective to switch the magnetic state of the half-selected cores 12. Immediately following the termination of field pulse 112, pre-write disturb pulse 118, which is generated in source 46, is coupled to line 50Z by switch means 48. Pre-write disturb pulse 118 performs the same function as post-write disturb pulse 85 of FIG. 3a setting all half-selected cores which are in a Write Disturb State due to a half-select write pulse into a Read Disturb State due to the read directed prewrite disturb pulse. Pulse 118 is of such duration as to overlap the leading edges of pulses 114 and 116, so as to restrict the effective drive field amplitude to the amplitude of the half-select field $H/2$. If a 0 is to be written into core 12a an inhibit pulse 120, which originates in source 48, and which overlaps the trailing edges of pulses 114 and 116, is coupled to line 50Z by switch means 48. The coaction of pulses 114, 116, 118 and 120 generate field pulse 122 at core 12a, which core is in the area of the intersection of lines 34X, 42Y and 50Z. After an appropriate period of time to permit the decay of core and signal disturbances—termed the "noise decay time"—the following read-write cycle may be initiated. If a 1 is to be written into core 12a, a pre-write disturb pulse 118 is coupled to line 50Z as in the write 0 operation. However, inhibit pulse 120 is not coupled to line 50Z. Not coupling pulse 120 to line 50Z permits pulses 114a and 116a to coact, generating field pulse 124 which switches core 12a to the magnetic state opposite to a stored 0 state, or to a stored 1 state. Pulse 124 is of the amplitude of a full-select field H, which is of sufficient amplitude to switch the magnetic state of core 12a to a stored 1 state, such as point 16 of FIG. 1. However, the overlapping of pulse 118a with the leading edges of pulses 114a and 116a reduces the duration of the effective drive field to less than that required to set core 12a into a stored 1 at point 16, so as to time-limit the effective field on core 12a to that amplitude-duration characteristic which sets core 12a into a stored 1 at time-limited switching condition of point 22 of FIG. 1.

Reading of information from core 12a is initiated by a Read step which is similar to the Clear step of the Write operation except that when core 12a containing a stored 1 is switched, the change in flux in core 12a is detected on line 60S and the voltage induced therein is coupled to stage 54 setting it to a stored 1. The Restore step of the Read operation is similar to the Write step of the Write operation and its function is to write-in the information which was destroyed during the Read step. The Disturb step of the Read operation serves the same function as the Disturb step of the Write operation.

Having in mind the detailed description of memory system 28 operation utilizing the signal and drive field relationships of FIG. 3b, the full advantages of applicant's novel method of operation can now be fully appreciated. As stated previously, applicant's novel method includes the use of the concepts of time-limiting switching and a pre-write disturb pulse to reduce memory system cycle time. A comparison of the control signal relationships of FIG. 3a with those of 3b clearly indicates a substantial decrease in memory system cycle time. At time $t_0$ both methods, that of FIGS. 3a and 3b, initiate Read pulses having a similar amplitude-duration characteristic. Also, at $t_2$ both methods terminate these Read pulses having placed the magnetic state of core 12a into a stored 0 condition such as at point 24 of FIG. 1. During the span of the Read pulses such as at time $t_1$, a Read-strobe sequence is initiated by appropriate circuitry to permit degradation of the core and signal disturbances due to initiation of the read pulses prior to sampling the read-out information and to initiate a decision cycle. This decision cycle may be utilized in memory systems utilizing destructive read-out of the stored information to permit the control circuitry to first determine if the read-out information is a 0 or a 1 and, secondly upon making this determination, to initiate the inhibit pulse if a 0 is to be written back in or restored. Thus, decision time determines the minimum time allowable between initiation of the Read-strobe sequence and initiation of the inhibit pulse.

FIG. 3a dramatically illustrates the effect of the decision time upon the cycle time when not utilizing applicant's novel method of memory system operation. As it has been found necessary to have the inhibit pulse span the Write pulse to prevent the possibility of an erroneous full-select Write field H being coupled to a full-selected core 12a during a Write 0 operation, initiation of inhibit pulse 82 precedes initiation of Write pulses 78 and 80. Further, post-write disturb pulse 85 occurring unconditionally, i.e., whether or not a 0 or a 1 is to be written, must follow the termination of the inhibit pulse and must not be coincident with the application of Write pulses 78 and 80 to effect the disturb function of the selected core 12a. Thus, FIG. 3a illustrates the initiation of the inhibit pulse 85 at time $t_7$ after the termination of the decision time and terminating at time $t_{13}$ with post-write disturb pulse 85 terminating at time $t_{14}$. After termination of the post-write disturb pulse 85, an appropriate period of time, termed "noise decay time" is permitted to pass to allow the core and signal disturbances due to the Write operation to subside prior to initiation of the next read-write cycle. FIG. 3a illustrates a typical memory system cycle time terminating at time $t_{18}$.

FIG. 3$b$ illustrates the effect of applicant's novel method upon the memory system cycle time. Here the decision time, equal to the decision time of FIG. 3$a$, overlaps the occurrence of the Write pulses 114 and 116. This is possible utilizing the concept of time-limited switching wherein the asymmetrical Write 1 field pulse 124—as regards the Write 0 field pulse 122—amplitude duration characteristic is achieved through the use of applicant's pre-write disturb pulse 118. Here the unconditional occurrence of pre-write disturb pulse 118 occurs during decision time and terminates coincidentally with the termination of the decision time. Thus, as in FIG. 3$a$, decision time terminates at time $t_7$. However, the timing of Write pulses 114$a$, 116$a$ and the pre-write disturb pulse 118$a$ is such as to provide a Write 1 pulse 124 of a sufficient amplitude-duration characteristic to cause the selected core 12$a$ in a Write 1 operation to assume a time-limited store 1 position such as point 22 of FIG. 1. Where a Write 0 operation is to be performed, inhibit pulse 120 effectively extends the duration of pre-write disturb pulse 118 until time $t_{10}$ ensuring a maximum drive field of half-select magnitude $H/2$. Although the decision time, Read pulse time, Write pulse time, and Noise decay time durations of FIG. 3$a$ and FIG. 3$b$ are equal, applicant's novel method reduces the cycle time of FIG. 3$a$ of $t_{18}$ to the cycle time of FIG. 3$b$ of $t_{14}$.

FIG. 3$c$ illustrates the effect of the utilization of the combination of applicant's pre-write disturb pulse and the concept of amplitude-limited switching on the reduction of memory system cycle times. The conditions of core operation exemplified by FIG. 3$c$ are similar to that of FIG. 3$a$, the only exception being the positioning of the disturb pulse before the Write operation in FIG. 3$c$ rather than after the Write operation as in FIG. 3$a$. It is apparent, upon a comparison of FIG. 3$c$ and FIG. 3$a$, that the reduction in cycle time is equal to the duration of the disturb pulse, the saving being accomplished by utilizing a pre-write disturb pulse 130 during the decision time and prior to initiation of the inhibit pulse 132 rather than utilizing a post-write disturb pulse 85 after the inhibit pulse 82 as in FIG. 3$a$. Thus, it is apparent that applicant's method of operation of a memory system as exemplified by the signal and drive field relationships of FIG. 3$b$ and FIG. 3$c$, achieves an appreciable reduction of memory system cycle time over that required in conventional memory system operation as exemplified by the signal and drive field relationships of FIG. 3$a$.

To better illustrate the mechanics of applicant's novel method of operating a magnetic memory element, or core, of a memory system, FIGS. 4 and 5 are presented. FIG. 4 illustrates a typical sequence of control signals and drive fields applied to a core in the bit-organized memory of FIG. 2. Wave forms 140, 142 and 144 are the signals emanating from sources 30, 38 and 46, respectively, and coact to produce the effective field of wave form 146 on core 12$a$. With the magnetic state of core 12$a$ initially at point 14 indicative of a store 0 and with pulses 148 and 150 applied to lines 34X and 42Y, respectively, coacting to generate field pulse 152 in the area of core 12$a$, the magnetic state of core 12$a$ is caused to follow the line defined by points 14–154–26–154 returning to rest at point 14. Next, pre-write disturb pulse 156 is applied to line 50Z producing field pulse 158 which causes the magnetic state of core 12$a$ to follow the line defined by points 14–154 returning to rest at point 14. Next, restore, or write, pulses 160 and 162 are applied to lines 34X and 42Y, respectively, which coact with pre-write disturb pulse 156 to generate field pulses 164 and 166 which cause the magnetic state of core 12$a$ to follow hysteresis loop 10 coming to rest at point 16 indicative of a stored 1. If a 0 is to be written into core 12$a$ inhibit pulse 168 coacts with pulses 156, 160 and 162 generating field pulses 164, 170 and 172 which cause the magnetic state of core 12$a$ to follow the minor hysteresis loop defined by point 14–174 and coming to rest at point 176 which is the Disturbed 0 Write State. Thus, after completion of the full-select write operation the magnetic state of core 12$a$ if storing a 0 is a point 176 which is the Disturbed 0 Write State and if storing a 1 is at point 16 which is the Undisturbed 1 Write State.

With the magnetic state of core 12$a$ at point 16 and subjected to a half-select field pulse 180 due to pulse 182 flowing through line 34X, the magnetic state of core 12$a$ is caused to follow the minor hysteresis loop defined by points 16–184–186–188 coming to rest at point 190 which is the Disturbed 1 Read State. Next, pre-write disturb pulse 156$a$ is applied to line 50Z producing field pulse 192 which causes the magnetic state of core 12$a$ to follow the minor hysteresis loop defined by points 190–194–186–188 and returning to rest at point 190. Then, half-select pulse 196 is applied to line 34X which coacts with pre-write disturb pulse 156$a$ to generate field pulses 198 and 200 which cause the magnetic state of core 12$a$ to follow the minor hysteresis loop defined by points 190–202–204–206 coming to rest at point 208 which is the Write 1 Disturbed State and which is substantially nearer the Undisturbed 1 state than the Disturbed 1 Read state. Now, the next subsequent pre-write disturb pulse 156$b$, when applied to line 50Z, generates field pulse 210 which causes the magnetic state of core 12$a$ to follow the minor hysteresis loop defined by the points 208–212–186–188 coming to rest at point 190 which is the Disturbed 1 Read State. The next subsequent half-select read-restore operation consisting of applying pulses 214 and 216 to line 34X and pulse 156$c$ to line 50Z causes the magnetic state of core 12$a$ to be moved from point 190, the Read 1 Disturbed State, through point 208, the Write 1 Disturbed State, and back to point 190.

With the magnetic state of core 12$a$ at point 176 and subjected to a half-select field pulse 180 due to pulse 182 flowing through line 34X, the magnetic state of core 12$a$ is caused to follow the minor hysteresis loop defined by points 176–220–222–224 coming to rest at point 226 which is the Disturbed 0 Read State. Next, pre-write disturb pulse 156$a$ is applied to line 50Z producing field pulse 192 which causes the magnetic state of core 12$a$ to follow the minor hysteresis loop defined by points 226–228–154 coming to rest at point 14 which is the Undisturbed 0 Read State. Then half-select pulse 196 is applied to line 34X which coacts with pre-write disturb pulse 156$a$ to generate field pulse 198 and 200 which cause the magnetic state of core 12$a$ to follow the minor hysteresis loop defined by points 14–174 coming to rest at point 176 which is the Disturbed 0 Write State. Now, the next subsequent pre-write disturb pulse 156$b$, when applied to line 50Z, generates field pulse 210 which causes the magnetic state of core 12$a$ to follow the minor hysteresis loop defined by the points 176–220–222–224 coming to rest at point 226 which is the Disturbed 0 Read State. The next subsequent half-select read-restore operation consisting of applying pulses 214 and 216 to line 34X and pulse 156$c$ to line 50Z causes the magnetic state of core 12$a$ to be moved from point 176, the Write 0 Disturbed State, through point 226, the Read 0 Disturbed State and back to point 176.

In any bit-organized memory of a plane of N by N cores there are 2 $(N-1)$ cores receiving a half-select pulse, $N^2-2$ $(N-1)$ cores receiving only a pre-write disturb pulse, and only one core receiving a full-select pulse. It has been discovered by applicant that the noise induced in an output line, such as line 60S, due to the change of the magnetic state of the 2 $(N-1)$ half-selected cores from the Write 1 Disturbed State to the Read 1 Disturbed State is substantially less than the output induced in output line 60S due to the change of the magnetic state of the single full-selected core from the Write 1 Disturbed State to the Read 0 Undisturbed State. Further, by preceding a half-select operation by a no-select operation consisting of only a pre-write disturb pulse, the magnetic states of $N^2-2(N-1)$ cores are caused to move from a Write 1 Disturbed State to a Read 1 Disturbed State and from a Write 0 Disturbed State to a Read 0 Disturbed State, the latter states causing substantially less noise to be induced in the sense line during the following half-select operation than the former.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A magnetic memory apparatus having a plurality of cores, each core capable of being set into at least first and second substantially high flux density remanent magnetic states, said cores arranged in a plurality of similar planes, the cores of each plane being arranged in a plurality of rows and columns with a core being located at the intersection of each row and column, a first group of separate conductors each conductor coupled to all the cores of similar rows of each plane, a second group of separate conductors each conductor coupled to all the cores of similar columns of each plane, a third group of separate conductors each conductor coupled to all the cores of each plane, means for providing a symmetrical control signal of a first polarity read pulse followed by a second and opposite polarity write pulse said signal coupled separately to each conductor of said first and second groups with any core of any plane being capable of being individually selected to be set into said first or second remanent magnetic state by the coaction of said read-write pulses, respectively, when said read-write pulses are coupled to a conductor of said first and second groups which conductors are coupled to said selected core, the improvement comprising: coupled to said third group of conductors; first means for providing a first polarity pre-write disturb pulse intermediate in time said read-write pulses, and second means for selectively providing an inhibit pulse of the same polarity as said pre-write disturb pulse and of such duration such that said inhibit pulse shall at least substantially overlap said write pulse and shall have substantially the opposite magnetic effect upon any core as one of said write pulses.

2. A magnetic memory apparatus having a plurality of cores, each core capable of being set into at least first and second substantially high flux density remanent magnetic states, said cores arranged in a plurality of similar planes, the cores of each plane being arranged in a plurality of rows and columns with a core being located at the intersection of each row and column, a first group of separate conductors each conductor coupled to all the cores of similar rows of each plane, a second group of separate conductors each conductor coupled to all the cores of similar columns of each plane, a third group of separate conductors each conductor coupled to all the cores of each plane, means for providing a symmetrical control signal of a first polarity read pulse followed by a second and opposite polarity write pulse said signal coupled separately to each conductor of said first and second groups with any core of any plane being capable of being individually selected to be set into said first or second remanent magnetic state by the coaction of said read-write pulses, respectively, when said read-write pulses are coupled to a conductor of said first and second groups which conductors are coupled to said selected core, the improvement comprising: coupled to said third group of conductors; first means for providing a first polarity pre-write disturb pulse at least partially intermediate in time said read-write pulses, and second means for selectively providing an inhibit pulse of the same polarity as said-pre-write disturb pulse and of such duration such that said inhibit pulse shall at least substantially overlap said write pulses and shall have at least substantially the opposite magnetic effect upon any core as one of write pulses, and said pre-write disturb pulse shall at least partially overlap said write pulses so as to cause said selected core to be placed into a time-limited magnetic stable-state.

3. A magnetic memory apparatus having a plurality of cores, each core being capable of being set into at least first and second substantially high flux density remanent magnetic states, said cores being arranged in P similar planes, the cores of each plane being arranged in R rows of C columns with a core being located at the intersection of each row and column, first group of R conductors each conductor coupled to all the cores of similar rows of each plane, a second group of C conductors each conductor coupled to all the cores of similar columns of each plane, a third group of P conductors each conductor coupled to all the cores of separate planes, a fourth group of S conductors each conductor coupled to all the cores of separate planes, first drive means for coupling a drive signal of symmetrical first polarity read and second and opposite polarity write pulses separately to each conductor of said first groups, second drive means for coupling a drive signal similar to the drive signal of said first drive means separately to each conductor of said second group, third drive means for coupling a disturb pulse of the same polarity as the read pulse of the first and second drive means separately to each conductor of said third group, fourth drive means for coupling an inhibit pulse of the same polarity as the disturb pulse separately to each conductor of said third group; the relationship of the read, write, disturb, and inhibit pulses being such that the read and write pulses are symmetrical bipolar pulses producing drive fields of substantially the same amplitude-duration characteristics so as to provide half-select read and write drive fields to the coupled cores, the disturb pulse occurring at least partially intermediate in time said read and write pulses and producing drive fields having an amplitude-duration characteristic substantially less than that of said read and write pulses, and the inhibit pulse occurring substantially subsequent to said disturb pulse and when combined with said disturb pulse the combination overlapping in time said write pulse and producing a drive field having an amplitude-duration characteristic substantially greater than said write pulse; the coincidence at a full-selected core of the first and second drive means read pulses producing a drive field having an amplitude-duration characteristic sufficient to set said full-selected core into a substantially unsaturated amplitude-limited magnetic stable-state as an undisturbed read 0 state; the coincidence at a full-selected core of the first and second drive means write pulses producing a drive field having an amplitude-duration characteristic sufficient to set said full-selected core into a substantially unsaturated amplitude-limited magnetic stable-state as a first undisturbed write 1 state which is of substantially the same flux density as said undisturbed read 0 state but of the opposite magnetic sense; the overlapping in time of the disturb pulse and the coincident write pulses at the full-selected core coacting so as to produce a drive field having an amplitude-duration characteristic only sufficient to set said full-selected core into a time-limited magnetic stable-state as a second undisturbed write 1 state which is of substantially less flux density than said first undisturbed write 1 state, a subsequent half-select read-write drive field causing the magnetic state of the half-selected core to move to a disturbed write 0 state if initially in a 0 state and to a disturbed write 1 state if initially in a 1 state whereby a next subsequent disturb pulse drive field causes the magnetic state of said half-selected core to move into a magnetic stable-state which causes substantially less noise to be induced in the conductor of said fourth group which is coupled to said half-selected core upon a next subsequent half-select drive field being coupled to said half-selected core.

4. A magnetic memory apparatus having a plurality of cores, each core being capable of being set into at least first and second substantially high flux density remanent magnetic states, said cores being arranged in P similar planes, the cores of each plane being arranged in R rows of C columns with a core being located at the intersection of each row and column, a first group of R conductors each conductor coupled to all the cores of similar rows of each plane, a second group of C conductors each conductor coupled to all the cores of similar columns of each plane, a third group of P conductors each conductor coupled to all the cores of separate planes, a fourth group of S conductors each conductor coupled to all the cores of separate planes, first drive means for coupling a drive signal of symmetrical first polarity read and second and opposite polarity write pulses separately to each conductor of said first group, second drive means for coupling a drive signal similar to the drive signal of siad first drive means separately to each conductor of said second group, third drive means for coupling a disturb pulse of the same polarity as the read pulse of the first and second drive means separately to each conductor of said third group, fourth drive means for coupling an inhibit pulse of the same polarity as the disturb pulse separately to each conductor of said third group; the relationship of the read, write, disturb, and inhibit pulses being such that the read and write pulses are symmetrical bipolar pulses producing drive fields of substantially the same amplitude-duration characteristics so as to provide half-select read and write drive fields to the coupled cores, the disturb pulse occuring substantially intermediate in time said read and write pulses producing drive fields and having an amplitude-duration characteristic substantially less than that of said read and write pulses, and the inhibit pulse occurring substantially subsequent to said disturb pulse and when combined with said disturb pulse the combination overlapping in time said write pulse and producing a drive field having an amplitude-duration characteristic substantially greater than said write pulse; the coincidence at a full-selected core of the first and second drive means read pulses producing a drive field having an amplitude-duration characteristic sufficient to set said full-selected core into a substantially unsaturated amplitude-limited magnetic stable-state as an undisturbed read 0 state; the coincidence at a full-selected core of the first and second drive means write pulses producing a drive field having an amplitude-duration characteristic sufficient to set said full-selected core into a substantially unsaturated amplitude-limited magnetic stable-state as a first undisturbed write 1 state which is of substantially the same flux density as said undisturbed read 0 state but of the opposite magnetic sense; a subsequent half-select read-write drive field causing the magnetic state of the half-selected core to move to a disturbed write 0 state if initially in a 0 state and to a disturbed write 1 state if initially in a 1 state whereby a next subsequent disturb pulse drive field causes the magnetic state of said half-selected core to move into a magnetic stable-state which causes substantially less noise to be induced in the conductor of said fourth group which is coupled to said half-selected core upon a next subsequent half-select drive field being coupled to said half-selected core.

5. A magnetic memory apparatus having a plurality of cores, each core being capable of being set into at least first and second substantially high flux density remanent magnetic states, said cores being arranged in P similar planes, the cores of each plane being arranged in R rows of C columns with a core being located at the intersection of each row and column, a first group of R conductors each conductor coupled to all the cores of similar rows of each plane, a second group of C conductors each conductor coupled to all the cores of similar columns of each plane, a third group of P conductors each conductor coupled to all the cores of separate planes, a fourth group of S conductors each conductor coupled to all the cores of separate planes, first drive means for coupling a drive signal of symmetrical first polarity read and second and opposite polarity write pulses separately to each conductor of said first group, second drive means for coupling a drive signal similar to the drive signal of said first drive means sepaartely to each conductor of said second group, third drive means for coupling a disturb pulse of the same polarity as the to the drive signal of said first drive means separately to each conductor of said third group, fourth drive means for coupling an inhibit pulse of the same polarity as the disturb pulse separately to each conductor of said third group; the relationship of the read, write, disturb, and inhibit pulses being such that the read and write pulses are symmetrical bipolar pulses producing drive fields of substantially the same amplitude-duration characteristics so as to provide half-select read and write drive fields to the coupled cores, the disturb pulse occurring at least partially intermediate in time said read and write pulses and producing drive fields having an amplitude-duration characteristic substantially less than that of said read and write pulses, and the inhibit pulse occurring substantially subsequent to said disturb pulse and when combined with said disturb pulse the combination overlapping in time said write pulse and producing a drive field having an amplitude-duration characteristic substantially greater than said write pulse; the coincidence at a full-selected core of the first and second drive means read pulses producing a drive field having an amplitude-duration characteristic sufficient to set said full-selected core into a substantially unsaturated amplitude-limited magnetic stable-state as an undisturbed read 0 state; the coincidence at a full-selected core of the first and second drive means write pulses producing a drive field having an amplitude-duration characteristic sufficient to set said full-selected core into a substantially unsaturated amplitude-limited magnetic stable-state as a first undisturbed write 1 state which is of substantially the same flux density as said undisturbed read 0 state but of the opposite magnetic sense; the overlapping in time of the disturb pulse and the coincident write pulses at the full-selected core coacting so as to produce a drive field having an amplitude-duration characteristic sufficient to set said full-selected core into an amplitude-limited magnetic stable-state as an undisturbed write 1 state which is of substantially the same flux density as said first undisturbed write 1 state, a subsequent half-select read-write drive field causing the magnetic state of the half-selected core to move to a disturbed write 0 state if initially in a 0 state and to a disturbed write 1 state if initially in a 1 state whereby a next subsequent disturb pulse drive field causes the magnetic state of said half-selected core to move into a magnetic stable-state which causes substantially less noise to be induced in the conductor of said fourth group which is coupled to said half-selected core upon a next subsequent half-select drive field being coupled to said half-selected core.

6. A magnetic memory apparatus having a plurality of cores, each core being capable of being set into at least first and second substantially high flux density remanent magnetic states, said cores being arranged in P similar planes, the cores of each plane being arranged in R rows of C columns with a core being located at the intersection of each row and column, a first group of R conductors each conductor coupled to all the cores of similar rows of each plane, a second group of C conductors each conductor coupled to all the cores of similar columns of each plane, a third group of P conductors each conductor coupled to all the cores of separate planes, a fourth group of S conductors each conductor coupled to all the cores of separate planes, first drive means for coupling a drive signal of symmetrical first polarity read and second and opposite polarity write pulses separately to each conductor of said first group, second drive means for coupling a drive signal similar to the drive signal of said first drive means separately to each conductor of said second group, third drive means for coupling a disturb pulse of the same polarity as the read pulses of the first and second drive means separately to each conductor of said third group, fourth drive means for coupling an inhibit pulse of the same polarity as the disturb pulse separately to each conductor of said third group; the relationship of the read, write, disturb, and inhibit pulses being such that the read and write pulses are symmetrical bipolar pulses producing drive fields of substantially the same amplitude-duration characteristics so as to provide half-select read and write drive fields to the coupled cores, the disturb pulse occurring at least partially intermediate in time said read and write pulses and producing drive field having an amplitude-duration characteristic substantially less than that of said read and write pulses, and the inhibit pulse occurring substantially subsequent to said disturb pulse and when combined with said disturb pulse the combination overlapping in time said write pulse and producing a drive field having an amplitude-duration characteristic substantially greater than said write pulse; the coincidence at a full-selected core of the first and second drive means read pulses producing a drive field having an amplitude-duration characteristic sufficient to set said full-selected core into a substantially saturated magnetic stable-state as an undisturbed read 0 state; the coincidence at a full-selected core of the first and second drive means write pulses producing a drive field having an amplitude-duration characteristic sufficient to set said full-selected core into a substantially unsaturated amplitude-limited magnetic stable-state as a first undisturbed write 1 state which is of substantially the same flux density as said undisturbed read 0 state but of the opposite magnetic sense; the overlapping in time of the disturb pulse and the coincident write pulses at the full-selected core coating so as to produce a drive field having an amplitude-duration characteritsic only sufficient to set said full-selected core into a time-limited magnetic stable-state as a second undisturbed write 1 state which is of substantially less flux density than said first undisturbed write 1 state, a subsequent half-select read-write drive field causing the magnetic state of the half-selected core to move to a disturbed write 0 state if initially in a 0 state and to a disturbed write 1 state if initially in a 1 state whereby a next subsequent disturb pulse drive field causes the magnetic state of said half-selected core to move into a magnetic stable-state which causes substantially less noise to be induced in the conductor of said fourth group which is coupled to said half-selected core upon a next subsequent half-select drive field being coupled to said half-selected core.

7. A magnetic memory apparatus having a core capable of being set into at least first and second substantially high flux density remanent magnetic states, a first conductor coupled to said core, a second conductor coupled to said core, and a third conductor coupled to said core, means coupled to said first conductor for providing a symmetrical first control signal of a first polarity read pulse followed by a second and opposite polarity write pulse, means coupled to said second conductor for providing a symmetrical second control signal of a first polarity read pulse followed by a second and opposite polarity write pulse, said first and second control signals being of substantially similar amplitude-duration characteristics, the coaction of said read-write pulses at said core setting the magnetization of said core into said first or second remanent magnetic state, the improvement comprising: coupled to said third conductor; first means for providing a first polarity pre-write disturb pulse intermediate in time said read-write pulses, and second means for selectively providing an inhibit pulse of the same polarity as said pre-write disturb pulse and of such duration such that said inhibit pulse shall at least substantially overlap said write pulses and shall have substantially the opposite effect upon said core as one of said write pulses.

8. A magnetic memory apparatus having a core capable of being set into at least first and second substantially high flux density remanent magnetic states, a first conductor coupled to said core, a second conductor coupled to said core and a third conductor coupled to said core, means coupled to said first conductor for providing a symmetrical first control signal of a first polarity read pulse followed by a second and opposite polarity write pulse, means coupled to said second conductor for providing a symmetrical second control signal of a first polarity read pulse followed by a second and opposite polarity write pulse, said first and second control signals being of substantially similar amplitude-duration characteristics, the coaction of said read-write pulses at said core setting the magnetization of said core into said first or second remanent magnetic state, the improvement comprising: coupled to said third conductor; first means for providing a first polarity pre-write disturb pulse intermediate in time said read-write pulses, and second means for selectively providing an inhibit pulse of the same polarity as said pre-write disturb pulse and of such duration such that said inhibit pulse shall at least substantially overlap said write pulses and shall have substantially the opposite effect upon said core as one of said write pulses, and said pre-write disturb pulse shall at least partially overlap said write pulses for causing said core to be placed into a time-limited magnetic stable-state.

9. A magnetic memory apparatus having a core capable of being set into at least first and second substantially high flux density remanent magnetic states, a first conductor coupled to said core, a second conductor coupled to said core and a third conductor coupled to said core, means coupled to said first conductor for providing a symmetrical first control signal of a first polarity read pulse followed by a second and opposite polarity write pulse, means coupled to said second conductor for providing a symmetrical second control signal of a first polarity read pulse followed by a second and opposite polarity write pulse, said first and second control signals being of substantially similar amplitude-duration characteristics, the coaction of said read-write pulses at said core setting the magnetization of said core into said first or second remanent magnetic state, the improvement comprising: coupled to said third conductor; means for providing a first polarity pre-write disturb pulse intermediate in time said read-write pulses, and for selectively providing an inhibit pulse of the same polarity as said pre-write disturb pulse and of such duration such that said inhibit pulse shall at least substantially overlap said write pulses and shall have substantially the opposite effect upon said core as one of said write pulses.

10. A magnetic memory apparatus having a plurality of cores, each core capable of being set into at least first and second substantially high flux density remanent magnetic states, said cores arranged in a planar array, the cores of the plane being arranged in a plurality of rows and columns with a core being located at the intersection of each row and column, a first group of separate conductors each conductor coupled to all the cores of a separate row, a second group of separate conductors each conductor coupled to all the cores of a separate column, a third separate conductor coupled to all the cores on the plane, means for providing a symmetrical control signal of a first polarity read pulse followed by a second and opposite polarity write pulse, said control signal coupled separately to each conductor of said first and second groups with any core of the plane being capable of being individually selected to be set into said first or second remanent magnetic state by the coaction of said read-write pulses, respectively, when said read-write pulses are coupled to a conductor of said first and second groups which conductors are coupled to said selected core, the improvement comprising: coupled to said third conductor; first means for providing a first polarity pre-write disturb pulse intermediate in time said read-write pulses and second means for selectively providing an inhibit pulse of the same polarity as said pre-write disturb pulse and of such duration such that said inhibit pulse shall at least substantially overlap said write pulses and shall have substantially the opposite magnetic effect upon any core as one of said write pulses.

11. A magnetic memory apparatus having a plurality of cores, each core capable of being set into at least first and second substantially high flux density remanent magnetic states, said cores arranged in a planar array, the cores of the plane being arranged in a plurality of rows and columns with a core being located at the intersection of each row and column, a first group of separate conductors each conductor coupled to all the cores of a separate row, a second group of conductors each conductor coupled to all the cores of a separate column, a third separate conductor coupled to all the cores of the plane, means for providing a symmetrical control signal of a first polarity read pulse followed by a second and opposite polarity write pulse, said control signal coupled separately to each conductor of said first and second groups with any core of the plane being capable of being individually selected to be set into said first or second remanent magnetic state by the coaction of said read-write pulses, respectively, when said read-write pulses are coupled to a conductor of said first and second groups which conductors are coupled to said selected core, the improvement comprising: coupled to said third conductor; first means for providing a first polarity pre-write disturb pulse intermediate in time said read-write pulses, said second means for selectively providing an inhibit pulse of the same polarity as said pre-write disturb pulse and of such duration such that said inhibit pulse shall at least substantially overlap said write pulse and shall have substantially the opposite magnetic effect upon any core as one of said write pulses, and said pre-write disturb pulse shall at least partially overlap said write pulses for causing said selected core to be placed into a time-limited magnetic stable-state.

12. A magnetic memory apparatus having a plurality of cores, each core capable of being set into at least first and second substantially high flux density remanent magnetic states, said cores arranged in a planar array, the cores of the plane being arranged in a plurality of rows and columns with a core being located at the intersection of each row and column, a first group of separate conductors each conductor coupled to all the cores of a separate row, a second group of separate conductors each conductor coupled to all the cores of a separate column, a third separate conductor coupled to all the cores of the plane, means for providing a symmetrical control signal of a first polarity read pulse followed by a second and opposite polarity write pulse, said control signal coupled separately to each conductor of said first and second groups with any core of the plane being capable of being individually selected to be set into said first or second remanent magnetic state by the coaction of said read-write pulses, respectively, when said read-write pulses are coupled to a conductor of said first and second groups which conductors are coupled to said selected core, the improvement comprising: coupled to said third conductor; means for providing a first polarity pre-write disturb pulse intermediate in time said read-write pulses, and for selectively providing an inhibit pulse of the same polarity as said pre-write disturb pulse and of such duration such that said inhibit pulse shall at least substantially overlap said write pulse and shall have substantially the opposite magnetic effect upon any core as one of said write pulses.

References Cited by the Examiner

UNITED STATES PATENTS

| | | | |
|---|---|---|---|
| 3,058,096 | 10/1962 | Humphrey et al. | 340—174 |
| 3,215,992 | 11/1965 | Schallerer | 340—174 |

BERNARD KONICK, *Primary Examiner.*

JAMES W. MOFFITT, *Examiner.*

UNITED STATES PATENT OFFICE

CERTIFICATE OF CORRECTION

Patent No. 3,321,749 May 23, 1967

William M. Overn

It is hereby certified that error appears in the above numbered patent requiring correction and that the said Letters Patent should read as corrected below.

Column 3, line 70, for "and" read -- an --; column 4, line 19, for "limitation" read -- initiation --; column 5, line 53, before "to" insert -- only --; column 10, line 3, for "a", second occurrence, read -- at --; column 13, line 14, for "siad" read -- said --; column 14, line 2, for "sepaartely" read -- separately --; line 5, for "to the drive signal of said first" read -- as the read pulse of the first and second --; column 15, line 11, for "field" read -- fields --; line 33, for "characteritsic" read -- characteristic --.

Signed and sealed this 16th day of July 1968.

(SEAL)

Attest:

Edward M. Fletcher, Jr.
Attesting Officer

EDWARD J. BRENNER
Commissioner of Patents